United States Patent

[11] 3,603,396

[72] Inventor Philip H. Braun
 Dallas, Tex.
[21] Appl. No. 885,343
[22] Filed Dec. 15, 1969
[45] Patented Sept. 7, 1971
[73] Assignee Atlantic Richfield Company
 New York, N.Y.

[54] METHOD FOR INCREASING SUBTERRANEAN FORMATION PERMEABILITY
 4 Claims, No Drawings

[52] U.S. Cl. .................................................. 166/261,
 166/303, 166/305 R
[51] Int. Cl. ..................................................... E21b 43/25
[50] Field of Search ............................................. 166/256,
 261, 268, 272, 275, 302, 303, 305 R, 312;
 252/8.55

[56] References Cited
 UNITED STATES PATENTS

| | | | |
|---|---|---|---|
| 3,483,923 | 12/1969 | Darley | 166/305 R |
| 3,537,524 | 11/1970 | McMillen | 166/305 R |
| 2,241,253 | 5/1941 | Garrison | 166/303 |
| 2,685,930 | 8/1954 | Albaugh | 166/302 |
| 2,782,859 | 1/1957 | Garst | 166/305 (R) |
| 3,179,171 | 4/1965 | Beale | 252/8.55 (A) X |
| 3,236,306 | 2/1966 | Atwood | 166/305 (R) |
| 3,292,702 | 12/1966 | Boberg | 166/303 |
| 3,349,032 | 10/1967 | Krieg | 166/275 |
| 3,422,890 | 1/1969 | Darley | 166/303 X |
| 3,500,925 | 3/1970 | Beiswanger et al. | 166/275 |

*Primary Examiner*—Ian A. Calvert
*Attorneys*—Blucher S. Tharp and Roderick W. MacDonald

ABSTRACT: A method for increasing the permeability of an already hydrated clay or shale subterranean formation by at least partially dehydrating at least a portion of the formation by heating or injection of a dehydrating liquid or gas, contacting at least part of the dehydrated portion of the formation with a material which hinders rehydration of the formation and thereafter exposing the formation to water.

METHOD FOR INCREASING SUBTERRANEAN FORMATION PERMEABILITY

BACKGROUND OF THE INVENTION

Heretofore much effort has been expended in an attempt to prevent the hydration of hydrophilic clays and shales that tend to expand in volume when hydrated. These procedures concentrate on preventing nonhydrated clays or shales from becoming hydrated, thereby maintaining as nearly as possible the normal nonhydrated permeability of the formation.

However, not all subterranean formations encountered are in a nonhydrated state. Many formations through which it is desirable to produce oil, gas, or other fluid, are substantially impermeable when initially encountered because they have already been hydrated by underground water.

Thus, it is very desirable to increase the permeability of these already hydrated subterranean formations, but the procedures heretofore employed have been directed to preventing hydration in the first place rather than to counteracting the already hydrated state.

SUMMARY OF THE INVENTION

According to this invention there is provided a method for increasing the permeability of a hydrated subterranean formation which tends to expand in volume when hydrated, the method comprising in its improvement at least partially dehydrating at least a portion of the formation, contacting at least part of the dehydrated portion of the formation with a material which will hinder rehydration of the formation, and thereafter allowing the thus treated formation to be exposed to water under normal conditions without substantial loss of the permeability increase obtained by the dehydration step.

The invention is useful in any procedure wherein it is important to have and to maintain a subterranean formation in a state which is permeable to the passage of liquids such as oil; gases, such as natural gas; and other fluids that may be present under the earth's surface and desirably retrieved therefrom. For example, this invention can be employed wherever water sensitive subterranean formations are encountered in drilling; secondary recovery procedures such as water flooding, steam injection fracturing, workovers well completion; and the like.

Accordingly, it is an object of this invention to provide a new and improved method for increasing the permeability of an already hydrated subterranean formation. It is another object to provide a new and improved method for improving the permeability of water sensitive formations which have been previously damaged by contact with water. It is another object to provide a new and improved method for increasing the permeability of a hydrated subterranean formation by dehydration thereof and the prevention of rehydration of the formation.

Other aspects, objects, and advantages of this invention will be apparent to those skilled in the art from this disclosure and the appended claims.

DETAILED DESCRIPTION OF THE INVENTION

According to this invention a subterranean formation, particularly one which contains one or more hydratable clays, one or more hydratable shales, and one or more combinations thereof, the clays and shales both tending to increase in volume when hydrated, is treated after the formation has been contacted with water from underground or other sources and therefore have become hydrated and expanded so as to substantially decrease the permeability of that formation relative to its nonhydrated permeability. This invention is particularly applicable to formations which contain substantial amounts of montmorillonite clay but is applicable to any subterranean formation which is subject to volume expansion upon hydration.

The hydrated formation is subjected to at least partial dehydration over at least a portion thereof as desired. All or any part of the formation can be dehydrated as desired and the extent of dehydration depends in part on the desired magnitude of increase of permeability for the formation. Generally, at least five volume percent of the water of hydration can be removed.

Dehydration can be carried out in any desired manner such as by heating the formation with an external downhole heater, contacting the formation with a hot gas such as hot air and the like, in situ combustion of a portion of the hydrocarbons present in the formation, and the like. In the case of treating with a hot gas when substantial amounts of oil are present in the formation, it may be desirable to remove at least part of the oil before dehydration. This could be accomplished by flushing the formation with propane, butane, liquefied petroleum gas, and other volatile solvents known in the art. If desired, dehydration techniques other than by heat energy can be employed such as the contacting of the formation with a liquid such as alcohol (ethyl, isopropyl, and the like) or acetone, or a gas which removes water from the formation. Generally, any procedure which will remove at least part of the water of hydration from the formation can be employed.

The thus dehydrated formation is then contacted with an effective hydration stabilizing amount of a material which will hinder rehydration of the formation upon subsequent contact of the formation with water. A large variety of material can be employed to prevent rehydration of the formation. Such materials are fully and completely disclosed together with a large group of exemplary materials in "The Encyclopedia of Chemical Technology by Kirk-Othmer," Second Edition, Vol. 7, 1965, pp. 302–303 Interscience Publishers, New York, the disclosure of which is incorporated herein by reference. Suitable materials include sodium nitrate, calcium nitrate, calcium chloride, zinc chloride, sodium silicate, sodium methysiliconate, polyoxyethlene sorbitol, nonylphenol, ethylene oxide adducts of phenol, and the like. Generally, multivalent cation donating materials other than those just mentioned can also be employed. Other suitable materials include polyquaternary amines which are fully and completely disclosed in U.S. Pat. No. 3,349,032 and complexes of sodium hydroxide with ethynyl-substituted naphthenic monoalchols which complexes are fully and completely disclosed in U.S. Pat. No. 3,108,069. The disclosures of both patents are incorporated herein by reference. Yet other materials which can be employed are polymers of vinyl pyrrolidone and vinyl ether, both having molecular weights in the range of from about 300,000 to about 8,000,000, preferably from about 500,000 to about 5,000,000. Other suitable materials known in the art can be employed in this invention.

The above materials are employed in amounts which are effective hydration stabilizing amounts and such amounts can vary widely depending upon the characteristics of the formation, the extent of dehydration desired for the formation, the stabilizing material being added thereto, the amount of the stabilizing materials being added, and the like. Thus, it is substantially impossible to delineate a specific range of amount of the material or materials used to hinder rehydration of the formation. However, generally, at least about 0.01 pounds of the material or mixture of materials can be employed per barrel of formation pore space.

In the practice of this invention a substantially nonpermeable, hydrated subterranean formation can be at least partially dehydrated with a consequent volume contraction of the water-swelled materials in the formation thereby increasing the permeability of the formation. This increased permeability is then at least partially fixed in the formation by treatment with an effective amount of the stabilizing material so that when the formation is exposed to surface or underground water, it will not rehydrate and reexpand to its initial state before dehydration. In this manner a substantially nonpermeable, hydrated subterranean formation can be rendered permeable for extended periods of time thereby allowing the production of oil, gas, or other fluids through that formation, a result which was unobtainable without the dehydration and rehydration stabilization concept of this invention.

EXAMPLE

A subterranean formation containing five weight percent montmorillonite clay and hydrated by the contact thereof with underground water is dehydrated in part by contact with 250° F. air for 24 hours.

After the formation is dehydrated and before it is rehydrated, the formation is contacted with a nonionic vinyl pyrrolidone polymer having a molecular weight range of from about 500,000 to about 5,000,000. About 0.023 pounds of the polymer per barrel of pore space of the formation is employed. The polymer is dispersed in the formation by dissolving the polymer in brine and then passing the brine solution through the formation.

The permeability of the formation is substantially increased by this process in that a greater volume of liquid flows through the formation per unit time as compared to the volume of the same liquid that can be retrieved in the same period of time and under the same pressure when the formation is hydrated.

Reasonable variations and modifications are possible within the scope of this disclosure without departing from the spirit and scope of this invention.

The embodiments of the invention in which an exclusive property or privilege is claimed are defined as follows:

1. In a method for increasing the permeability of a hydrated subterranean formation which contains at least one of hydrated clay and hydratable shale both of which tend to increase in volume upon hydration, the improvement comprising at least partially dehydrating at least a portion of said formation to cause said formation to contract in volume thereby increasing the permeability of said formation, maintaining said formation substantially free from contact with added water until its increased permeability is fixed, fixing said contracted formation and its increased permeability by contacting at least part of the dehydrated portion of said formation with an effective hydration stabilizing amount of at least one of sodium nitrate, calcium nitrate, calcium chloride, zinc chloride, sodium silicate, sodium methyl siliconate, and vinyl ether polymer having a molecular weight of from about 300,000 to about 8,000,000, and thereafter allowing the thus treated formation to again be exposed to water.

2. A method according to claim 1 wherein said hydration hindering material is employed in amounts of at least about 0.01 pounds per barrel of formation pore space.

3. A method according to claim 1 wherein said formation contains substantial amounts of montmorillonite clay.

4. A method according to claim 1 wherein said formation is dehydrated by heating same.